(No Model.)
R. P. WILSON.
PROCESS OF MAKING STEEL.
No. 453,227. Patented June 2, 1891.
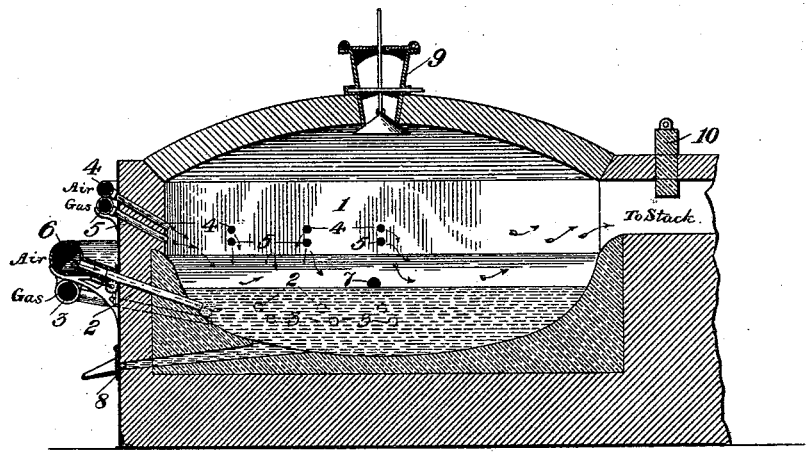
WITNESSES:
INVENTOR,
Riley P. Wilson
by Benj. R. Catlin Att'y.

UNITED STATES PATENT OFFICE.

RILEY PORTER WILSON, OF NEW YORK, N. Y.

PROCESS OF MAKING STEEL.

SPECIFICATION forming part of Letters Patent No. 453,227, dated June 2, 1891.

Application filed March 18, 1889. Renewed November 4, 1889. Again renewed May 9, 1890. Again renewed November 14, 1890. Serial No. 371,402. (No specimens.)

*To all whom it may concern:*

Be it known that I, RILEY PORTER WILSON, a citizen of the United States, residing at New York, in the county of New York and State of New York, have invented certain new and useful Improvements in the Process of Making Steel; and I do hereby declare the following to be a full, clear, and exact description of the invention, such as will enable others skilled in the art to which it appertains to make and use the same.

My invention relates to the art of making iron and steel, and has for its object to provide an economical and efficient mode of reducing iron oxides, purifying the resulting iron, and converting it into steel, when desired, in a single furnace by the use of gaseous fuel.

In practicing the invention I make use, preferably, of a furnace similar in form to what is known as an "open-hearth melting-furnace," that can be made with a capacity of from ten to forty tons of metal. A furnace of this or like general character I provide with tuyeres and connecting-pipes and a blower for forcing air into the hearth or metal receptacle of the furnace, and also with similar or analogous devices for introducing gas into the same. Similar instrumentalities are also provided to introduce air or gas at will into the upper part of the melting-chamber above the usual level of the material charged therein. This furnace is provided with means of usual and well-known character for charging the same with ore and flux, and has the customary outlet for gaseous products and also tap and slag holes. These various adjuncts of melting-furnaces are well known, including the fluid-pipes specified, though it is not usual to provide such furnaces with separate air and gas inlets both above and below the slag-hole or both above and below the level of the metal bath when the furnace is in operation. These various pipes for air and gas are of course provided with the customary or with any approved valves or cocks and with means for forcing air or gas therethrough. The gas-pipes, however, are preferably connected with a reservoir of gas under pressure, as with a conduit for natural gas, which gas is especially suitable for use in the operations to be hereinafter described, although any artificial gas or mixture of gases having a similar character or containing a large percentage of carbon or of carbon and hydrogen may be employed.

In the accompanying drawing is represented in section a furnace for carrying out my invention. The improvement is not, however, confined to the particular construction indicated. It is obvious that other well-known charging devices, air-tuyeres, and gas-supply pipes may be employed. Furthermore, my improvements are not inconsistent with the use either of basic or acid lining or additions, it being, however, primarily intended for use in connection with ores comparatively free from the most objectionable impurities.

The reference-figure 1 indicates the furnace-chamber; 2 and 5, gas-supply pipes, and 4 and 6 air-supply pipes; 7, a slag-hole; 8, a tap-hole; 9, a charging-chute, and 10 a damper for checking or shutting off the draft to the stack.

In carrying out the present improvement the hearth or metal receptacle of a furnace of the general character indicated is supplied in any convenient manner with a bath of molten pig-iron of from five to ten tons or more, and upon this is charged in suitable or usual proportions a mixture of pulverized iron ore and a flux, such as lime, usually in about the proportion of one-third lime and two-thirds ore, which, however, may be varied as may be required by the particular ore employed. The molten pig-iron is then desiliconized and decarbonized by an air-blast, and simultaneously, or very soon after the commencement of the air-blowing, a gas of the character above described is introduced into the furnace above the charge. Air is supplied in quantity such that part of it passing through the bath and the oxide unites with the gas, which latter is preferably introduced at a part of the combustion-chamber remote from the exit for the products of combustion. The burning of the impurities of the pig-metal, together with the combustion occurring above the charge, generates a high degree of heat, and the carbonic oxide produced by the union of oxygen with the carbon of the pig acts to some extent to reduce the ore. Should the air-blast be continued after the metal has been purified and until the molten iron begins to oxidize and to be carried into and through the superincumbent mass, it will be deoxidized by the gas or such part of it as may not have been arrested by the slag produced by the operation described. For this purpose the gas is at this stage supplied in excess, so that a reducing atmosphere will be maintained. When the metal has been purified by the air-blast, as set forth, and a high temperature produced, the supply of air below and of gas above the ore is cut off, and thereupon gas is introduced below through the lower pipes or tuyeres into the molten metal, and air also, in comparatively small quantity, is forced into the space above the ore. By this means the molten metal is speedily carburized, and at the same time the ore is reduced, gas being supplied in sufficient quantity. The carbonic oxide thus produced and any small portion of gas passing unchanged and entirely through the metal and ore meet the oxygen of the air supplied, as stated, at that point and are burned, with the effect to maintain the temperature. This step is continued until the iron has been highly carburized and until the flame above the ore indicates that the carburizing and reducing effects of the gas have passed the maximum, whereupon the air and gas are again shut off and the alternate pipes first employed are reopened to introduce air into the molten metal and gas above the ore, with the effect to decarburize the iron, as described above in connection with the earlier steps of the process. In a furnace which exposes a hundred square feet of metal surface in the bath from ten to thirty minutes will suffice for the reduction of the ore, the rapidity of the operation varying with the fineness of the ore. Mixed ore and flux reduced to about the fineness of sand are charged from time to time and the process continued by introducing air and gas in alternation, as specified, until the amount of molten metal has been increased to a desired or convenient limit. It is then finally purified by the air-blast and then recarburized to any desired degree by intermitting the air-blast and forcing in gas to produce steel. A portion is then tapped out and more or less of the slag withdrawn. If the work is to be continued, from about five to ten tons is left in the furnace. This, with the charge of ore, is then first treated with gas and subsequently with air again, substantially as before described. This alternate use of air and gas in and above the molten metal maintains a high temperature, reduces the ore, purifies the molten metal, and converts it into steel. In the first stage of the process gas containing carbon is introduced in excess above the charge and partially burned to heat the same, the gas being supplied in excess to maintain a reducing-atmosphere. In the second stage the molten metal is carburized by gas, sufficient being supplied that it may not only impart carbon to this molten iron, but that a portion may pass through the iron to reduce the superincumbent ore, any small excess that passes through both the iron and the ore, together with any carbonic oxide generated by the reduction of ore, being burned above the latter.

Having thus described my invention, what I desire to claim and secure by Letters Patent is—

1. The improvement in the art of making steel direct from the ore, which consists in providing a bath of molten iron, charging thereupon a suitable mixture of pulverized ore and flux, then introducing air into the molten metal and a reducing-gas above the ore simultaneously, intermitting this gas and air supply, and then introducing gas into the molten metal and air above the ore simultaneously, the gas being in excess, intermitting this air and gas supply and purifying the molten metal with air, and finally recarburizing it with gas, substantially as set forth.

2. In the art of making steel direct from the ore, the steps which consist in providing a bath of molten iron and charging thereon a mixture of fine ore and flux and introducing air alternately into the metal and above the ore and at the same time introducing gas high in carbon alternately into the metal and above the ore in a reverse order, substantially as set forth.

In testimony whereof I affix my signature in presence of two witnesses.

RILEY PORTER WILSON.

Witnesses:
JOHN T. MITCHELL,
BENJ. R. CATLIN.